(12) United States Patent
Hutchins et al.

(10) Patent No.: US 9,659,051 B2
(45) Date of Patent: May 23, 2017

(54) ENFORCING REFERENTIAL INTEGRITY FOR OBJECT DATA DOCUMENTS

(71) Applicant: BLADELOGIC, INC., Houston, TX (US)

(72) Inventors: Mark Hutchins, Millbury, MA (US); Zack Milousheff, San Jose, CA (US)

(73) Assignee: BladeLogic Inc., Houston, TX (US)

(*) Notice: Subject to any disclaimer, the term of this patent is extended or adjusted under 35 U.S.C. 154(b) by 291 days.

(21) Appl. No.: 14/579,436

(22) Filed: Dec. 22, 2014

(65) Prior Publication Data

US 2016/0179869 A1 Jun. 23, 2016

(51) Int. Cl.
*G06F 7/00* (2006.01)
*G06F 17/30* (2006.01)

(52) U.S. Cl.
CPC .. *G06F 17/30371* (2013.01); *G06F 17/30607* (2013.01)

(58) Field of Classification Search
CPC .................................................. G06F 17/30607
See application file for complete search history.

(56) References Cited

U.S. PATENT DOCUMENTS 6,714,943 B1 * 3/2004 Ganesh ............... G06F 17/3051

OTHER PUBLICATIONS

Javascript Object Notation (JSON), http://developers.memsql.com/docs/3.1/json/json.html, retrieved on Dec. 18, 2014, 16 pages.

* cited by examiner

*Primary Examiner* — Ajith Jacob
(74) *Attorney, Agent, or Firm* — Brake Hughes Bellermann LLP

(57) ABSTRACT

A metadata framework helps enforce referential integrity in object data documents. In one general aspect, a method includes generating a first data definition language statement, based on a class defined in a metadata framework, that creates a table in a relational database system to store an object data document. The table may include at least one column that corresponds to an identifying attribute in the object data document, at least one column that corresponds to a relationship attribute in the object data document, and a column that stores the object data document. The method may also include generating a second data definition language statement, based on the referential integrity metadata framework, that creates a foreign key constraint on the at least one column that corresponds to the relationship attribute when the relationship is not polymorphic, and issuing the first data definition language statement and the second data definition language statement.

20 Claims, 10 Drawing Sheets

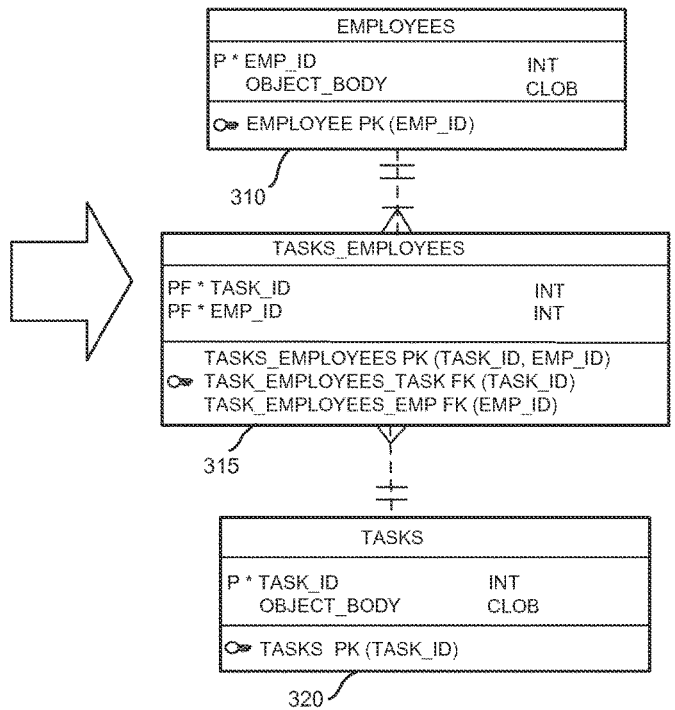
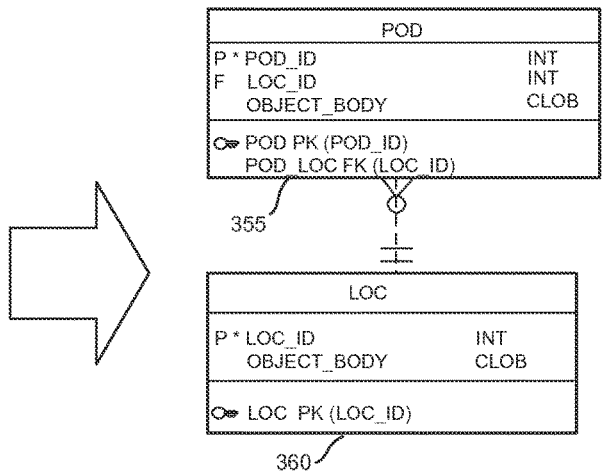
FIG. 3

TABLE DDL STATEMENT 550

```
For the value in CLASSES.TABLE_NAME; generate the table name header    552 →  CREATE TABLE POD (
replacing the token for the table name
For value of CLASSES.TABLE_NAME; retrieve each unique
CLASS_IDENTITY_ATTRIBUTE_SET.IDENTITY_ATTRIB_SET_ID {
                                                                        500
  For each CLASS_IDENTITY_ATTRIBUTE_SET_IDENTITY
  ATTRIB_SET_ID; retrieve the CLASS_IDENTITY_ATTRIBUTES.
  IDENTITY_ATTRIB_SET_ID {
    For each CLASS_IDENTITY_ATTRIBUTES.SEQ_ID {                         554 →  CREATE TABLE POD (POD_ID INT
      append <COLUMN_NAME> <DATA_TYPE>
      If IS_NULLABE is set to FALSE append NOT NULL                     556 →  CREATE TABLE POD (POD_ID INT NOT NULL
      ELSIF IS_NULLABLE is set to TRUE append NULL
      append a comma                                                           CREATE TABLE POD (POD_ID INT NOT NULL,
                                                                        558 →  INT NOT NULL,
    }
    Repeat above loops using uniqueCLASS_RELATION_ATTRIBUTE_SET                CREATE TABLE POD (POD_ID INT NOT NULL, LOC_ID
    and CLASS_RELATION_ATTRIBUTES                                       560 →  INT NOT NULL, OBJECT_BODY CLOB NOT NULL);
    Append object body, table definition end and terminator.                   CREATE TABLE POD (POD_ID INT NOT NULL, LOC_ID
                                                                        562 →  INT NOT NULL, OBJECT_BODY CLOB NOT NULL);
                                                                               ALTER TABLE POD ADD CONSTRAINT
    For the value in CLASSES.TABLE_NAME; generate the PRIMARY KEY
    header
    For value of CLASSES.TABLE_NAME; retrieve each                             CREATE TABLE POD (POD_ID INT NOT NULL, LOC_ID
    CLASS_IDENTITY_ATTRIBUTE_SET.IDENTITY_ATTRIB_SET_ID                 564 →  INT NOT NULL, OBJECT_BODY CLOB NOT NULL);
    WHERE IS_PRIMARY IS TRUE                                                   ALTER TABLE POD ADD CONSTRAINT POD_PK
      Add name of primary key from ATTRIBUTE_SET_NAME                          PRIMARY KEY (
    For each CLASS_IDENTITY_ATTRIBUTES.SEQ_ID {                                CREATE TABLE POD (POD_ID INT NOT NULL, LOC_ID
      append the <COLUMN_NAME>                                          566 →  INT NOT NULL, OBJECT_BODY CLOB NOT NULL);
      If row is not the last row append a comma                                ALTER TABLE POD ADD CONSTRAINT POD_PK
    End                                                                        PRIMARY KEY (POD_ID)
    }                                                                          CREATE TABLE POD (POD_ID INT NOT NULL, LOC_ID
    Append primary key end and terminator.                              568 →  INT NOT NULL, OBJECT_BODY CLOB NOT NULL);
                                                                               ALTER TABLE POD ADD CONSTRAINT POD_PK
                                                                               PRIMARY KEY (POD_ID);
```

FIG. 5

RI DDL STATEMENT 750

```
700

For the value in CLASSES.TABLE_NAME as parent retrieve each
CLASS_IDENTITY_ATTRIBUTE_SET.IDENTITY_ATTRIB_SET_ID {

Generate RI DDL header                                              ─────752→ ALTER TABLE For CLASS_IDENTITY_ATTRIBUTE_SET.IDENTITYT_ATTRIB_SET_ID retrieve
  CLASS_RELATIONS.RELATION_ATTRIB_SET_ID where non-polymorphic
    For CLASS_RELATIONS.RELATION_ATTRIB_SET_ID retrieve
    CLASS_RELATION_ATTRIBUTE_SET.CLASS_ID {
      For CLASS_RELATION_ATTRIBUTE_SET.CLASS_ID retrieve
      CLASSES.TABLE_NAME AS V_CHILD {
        • Append V_CHILD to the existing RI DDL statement.           ─────754→ ALTER TABLE TASKS_EMPLOYEES
        • Append to RI DDL statement " ADD CONSTRAINT                ─────756→ ALTER TABLE TASKS_EMPLOYEES ADD CONSTRAINT
          <CLASS_RELATION.RELATION_NAME> FOREIGN KEY ("                      TASK_EMPLOYEES_TASK_FK FOREIGN KEY (
        • For CLASS_RELATION_ATTRIBUTE_SET.
          RELATION_ATTRIB_SET_ID retrieve
          CLASS_RELATION_ATTRIBUTES.
          RELATION_ATTRIB_SET_ID
          For each SEQ_ID in ascending order
            Append COLUMN_NAME to the RI DDL statement               ─────758→ ALTER TABLE TASKS_EMPLOYEES ADD CONSTRAINT
            If row is not the last row append a comma                        TASK_EMPLOYEES_TASK_FK FOREIGN KEY (TASK_ID
          End
          Append and replace token ") REFERENCES                     ─────760→ ALTER TABLE TASKS_EMPLOYEES ADD CONSTRAINT
          (<V_PARENT>) (" to the RI DDL statement                            TASK_EMPLOYEES_TASK_FK FOREIGN KEY (TASK_ID)
                                                                             REFERENCES (TASKS) (
      }
  For CLASS_RELATION_ATTRIBUTE_SET.IDENTITY_ATTRIB_SET_ID{
  retrieve CLASS_IDENTITY_ATTRIBUTES. IDENTITY_ATTRIB_SET_ID{
    For each SEQ_ID in ascending order                               ─────762→ ALTER TABLE TASKS_EMPLOYEES ADD CONSTRAINT
      Append COLUMN_NAME to the RI DDL statement                            TASK_EMPLOYEES_TASK_FK FOREIGN KEY (TASK_ID)
      If row is not the last row append a comma                             REFERENCES (TASKS) (TASK_ID
    End }
  Append ");" to the RI DDL statement                                ─────764→ ALTER TABLE TASKS_EMPLOYEES ADD CONSTRAINT
                                                                             TASK_EMPLOYEES_TASK_FK FOREIGN KEY (TASK_ID)
}                                                                            REFERENCES (TASKS) (TASK_ID);
```

FIG. 7

ENFORCING REFERENTIAL INTEGRITY FOR OBJECT DATA DOCUMENTS

BACKGROUND

Object data documents are a convenient and ubiquitous means of transporting objects. In an object-oriented (OO) programming paradigm a data model is created which represents the class structures and the relationships between these structures. The object data documents in this type of model represent individual instances of these classes. Object data documents typically consist of attribute-value pairs, the attribute specifying the type of data and the value specifying the value of the attribute for a particular instance. Object data documents may be implemented in a variety of language independent data formats, such as such as JavaScript Object Notation (JSON), Extensible Markup Language (XML), and YAML™, to name a few. Object data documents are supported by many programming languages and often used to transport or transmit data objects between applications and computer systems.

The object data documents can be stored in a relational database (RDBS) to take advantage of ACID (atomic, consistent, isolated, and durable) principles during data modification, to take advantage of backup and restore operations, high availability features, and disaster recovery features provided by the database. The logical data model, which represents all the classes in the object model, is normalized in an RDBS implementation into a physical model which persists the instance object data in different tables and their corresponding attribute values in columns.

A limitation of this approach is that the object data documents, i.e., the application's objects, are decomposed into columns and are not persisted in their entirety. This limits the advantages for which object data documents are used, e.g., to transport whole objects amongst the different modules of an application or between the modules of different applications avoiding the decomposition into table-columns upon insert/update into the RDBS and construction of the object data document from table-columns upon data retrieval from the RDBS.

SUMMARY

Systems and methods provide a framework for storing intact object data documents in a relational database while enforcing referential integrity on the relationships between instances of the objects. The framework uses a referential integrity (RI) metadata framework to persist arbitrary object model relationships. The RI metadata framework is used to identify referential integrity attributes in the object data document and use these attributes to set up relational database tables and constraints (foreign keys or triggers) to maintain the relationships between objects. The system may use stored procedures, generated based on the RI metadata framework, to extract values for referential integrity attributes from object data documents and use the values to generate appropriate database statements to access, update, insert, and delete the data.

In one general aspect, a method includes generating a first data definition language statement, based on a class defined in a referential integrity metadata framework, that creates a table in a relational database system to store an object data document. The table may include at least one column that corresponds to an identifying attribute in the object data document, at least one column that corresponds to a relationship attribute in the object data document, and a column that stores the object data document. The method may also include generating a second data definition language statement, based on the referential integrity metadata framework, that creates a foreign key constraint on the at least one column that corresponds to the relationship attribute when the relationship is not polymorphic, and issuing the first data definition language statement and the second data definition language statement to generate relational database structures that persist object data documents and relationships between object in different object data documents.

Implementations can include one or more of the following features. For example, the method may also include determining unique data types for the identifying attribute and of the relationship attribute and generating extraction functions corresponding to respective unique data types, the extraction function taking a referential integrity attribute and an object data document as parameters and returning a value corresponding to the referential integrity attribute from the object data document, the value having a type corresponding to the data type. As another example, the method may also include generating a stored procedure for the class configured to extract a first value corresponding to the identifying attribute from the object data document, extract a second value corresponding to the relationship attribute from the object data document, construct a data manipulation language statement using the first value and the second value, and issue the data manipulation language statement. In some such implementations, the method may also associate an identifier for the stored procedure with the class in the referential integrity metadata framework.

As another example, the class may be a first class and the relationship attribute may be an identifying attribute for a second class defined in the referential integrity metadata framework. As another example, the method may include receiving a request from an application program to insert a new object data document, extracting a first value corresponding to the identifying attribute from the new object data document, extracting a second value corresponding to the relationship attribute from the new object data document, constructing a data manipulation language statement using the first value and the second value that inserts a record into the table, and issuing the data manipulation language statement, wherein the data manipulation language statement causes the relational database system to check the foreign key constraint prior to successfully inserting the record. In some such implementations, the method may also include determining, using the referential integrity metadata framework, an identifier for an insert stored procedure for the class and calling the insert stored procedure, the insert stored procedure performing the extracting, constructing, and issuing.

As another example, the class may be a first class, the table may be a first table, and the identifying attribute may be a first identifying attribute, and the method may also include determining whether a relationship between the relationship attribute and a second identifying attribute for a second class is polymorphic, when the relationship is not polymorphic: generating the second data definition language statement and issuing the statement, and when the relationship is polymorphic, generating a database trigger invoked when a row is inserted into the first table, the row including a new object data document in its entirety. The trigger may be being configured to extract a first value from the new object data document for the relationship attribute, determine a parent class for the relationship attribute from the object data document, determine a second table, using the referential integrity metadata framework, for the parent class, determine if the second table includes a row having a second value in a column corresponding to the second identifying attribute that matches the first value, and prevent the insertion of the row into the first table when the second table does not include the row having the second value.

In one general aspect, a system includes at least one hardware processor, at least one database environment, the database environment supporting triggers and foreign keys, at least one application program, and memory. The memory may store a referential integrity metadata framework that identifies classes in a hierarchy of objects, identifies, for each class, at least one identifying attribute of the class, identifies, for at least some classes, at least one relationship attribute for the class, and identifies, for each relationship attribute, a relationship with a corresponding identifying attribute in another class. The memory may also store an initialization module configured to use the referential integrity metadata framework to generate tables in the database environment based on the referential integrity metadata framework, each table corresponding to a class in the referential integrity metadata framework, generate primary keys for the tables based on the identifying attributes, generate referential integrity structures based on the relationship attributes, and generate at least one class-specific procedure for each class, the procedure for a class extracting a value for each identifying attribute and relationship attribute identified in the referential integrity metadata framework for the class, generate a data manipulation language statement using the extracted values, and issue the data manipulation language statement. The at least one application program may use the database environment to persist entire object data documents in their entirety and enforce referential integrity in relationships between object data documents.

In one general aspect, a method includes receiving an object data document and an operation to perform on the object data document from an application program, determining a class in a referential integrity metadata framework for the object data document, the referential integrity metadata framework specifying at least an identifying attribute and a relationship attribute from the object data document for the class, and calling a class-specific stored procedure based on the class. The class-specific stored procedure may be configured to extract a first value for the identifying attribute from the object data document, extract a second value for the relationship attribute from the object data document, build a data manipulation language statement using the first value and the second value that performs the operation on a table in a relational database system, the table corresponding to the class in the referential integrity metadata framework and including a column for the identifying attribute, a column for the relationship attribute, and a column that stores the object data document, and issue the data manipulation language statement for the relational database system to execute, the relational database system enforcing referential integrity constraints based on the relationship attribute.

Another aspect of the disclosure can be embodied on a computer-readable medium having recorded and embodied thereon instructions that, when executed by a processor of a computer system, cause the computer system to perform any of the methods disclosed herein.

The details of one or more implementations are set forth in the accompanying drawings and the description below.

Other features will be apparent from the description and drawings, and from the claims.

BRIEF DESCRIPTION OF THE DRAWINGS

FIG. 3 illustrates example object data documents and the database structures generated using the RI metadata framework, according to an implementation.

FIG. 5 illustrates example pseudo-code for using the RI metadata framework to generate example data definition language (DDL) statements that build relational database structures to persist object data documents for and enforce referential integrity in an object model, according to an implementation.

FIG. 7 illustrates example pseudo-code for using the RI metadata framework to generate example data definition language (DDL) statements that build foreign keys for non-polymorphic relationships in the object model, according to an implementation.

DETAILED DESCRIPTION

Figure 1:
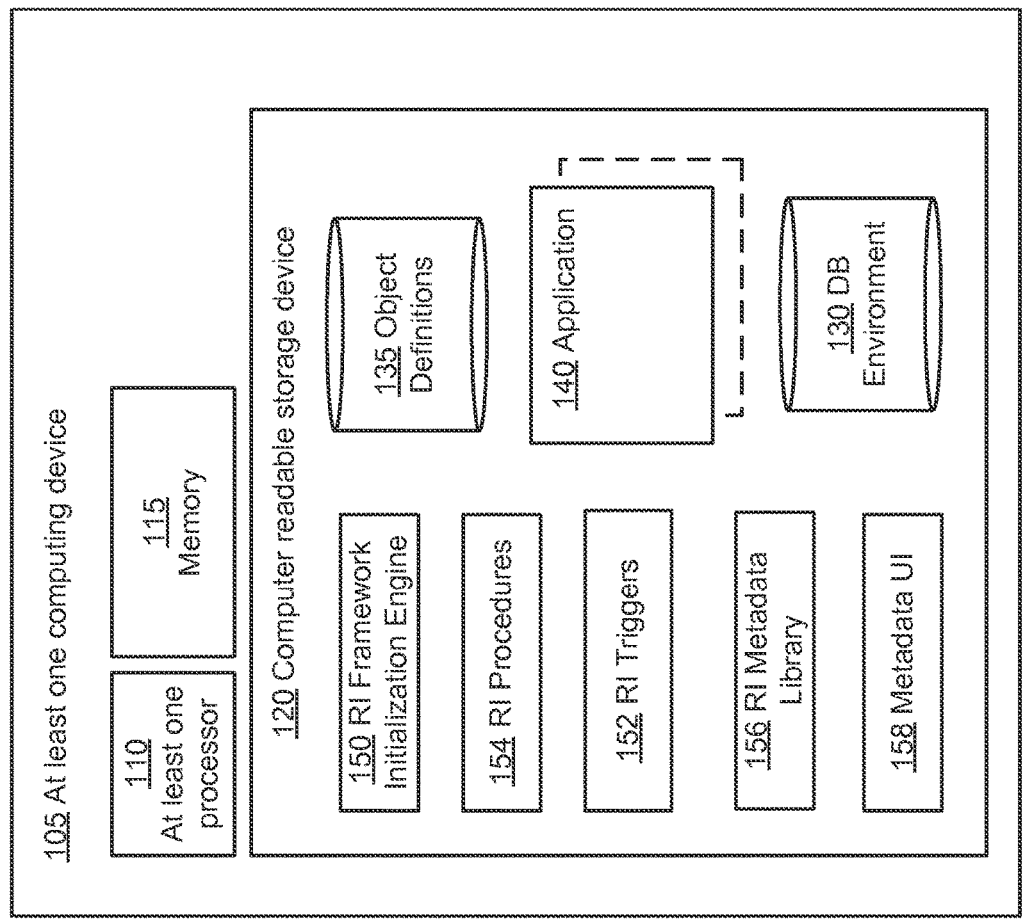
FIG. 1 is a block diagram that illustrates an object document referential integrity system, according to an implementation.

The systems and methods described herein can be used to transparently enforce referential integrity in an object model while maintaining the object data document in its entirety. The systems and methods described can be used with any database that supports triggers and foreign keys. Implementations include a referential integrity (RI) metadata framework that identifies identifying attributes and relationship attributes of classes in an object model and uses the RI metadata framework to build relational database structures to enforce referential integrity in the object model. Referential integrity (RI) is a concept that ensures relationships between database tables remain consistent. Put another way, RI ensures that references to data in a first table to data in a second table remain valid. For example, a database table may include information on an employee that includes a citizenship country code. The database may include a country table that has information for each country. RI enforcement ensures that an employee record cannot have a citizenship country code that does not exist in the country table and that a country code in the country table is not deleted when an employee record still has the code as the citizenship country code. Relational databases often enforce referential integrity through the use of foreign keys, meaning a column in a table is identified as existing as another column in another table. In the example above, the citizenship country code is identified in the employee table as a foreign key referring to the country table.

RDBS have the ability to store large documents in text fields, such as CLOB (character large object) fields or other similar data types. Thus, an RDBS can store an entire object data document in one column of one table, enabling the system to take advantage of backup, restore, and high availability features provided by the database vendor. But storing the object data document in such a manner eliminates the ability to enforce referential integrity amongst the relationships of the different instances of classes, which in turn opens the possibility for referential data corruption and does not ensure high data quality. Implementations provide a framework to identify relationship and identifying attributes for classes and extract the values for these attributes from instances in the class, e.g., from an object data document, and use these attributes and values to enforce referential integrity while persisting the entire object data document.

The referential integrity metadata framework hides the relational database implementation from the application developers who write code for an object model. The application developers may call a generic function to insert, update, delete, or change an instance of an object, for example passing the name of the class and the object data document as parameters. Implementations may use the generic function to select one or more class-specific stored procedures used to find referential integrity attributes and their values in the corresponding object data document to be updated and use those values to maintain the data in the relational database tables. Updates, including inserts and deletions, which will fail if the update violates the referential integrity rules set up via relational database structures.

FIG. 1 is a schematic diagram that illustrates an example object data document referential integrity system 100 (also referred to herein as "object data document RI system"). The object data document RI system 100 can be embodied, for example, on one or more source computing devices. The object data document RI system 100 can be, for example, a server that includes one or more computing devices 105, multiple servers that include one or more computing devices 105, etc. Multiple computing devices 105 may be in communication with each other via a communications network (not shown). For example, the network can be wired or wireless and can include, a local area network (LAN), a wide area network (WAN), the Internet, etc. implemented using, for example, gateway devices, bridges, switches, and/or so forth. The network can include one or more segments and/or can have portions based on various protocols such as XCF, TCP/IP, SNA, Internet Protocol (IP) and/or other communication protocols including a proprietary protocol. The network can include at least a portion of the Internet. In some implementations, the network can include multiple computing devices and/or multiple server devices.

The computing device 105 can include one or more processors 110 formed in a substrate configured to execute one or more machine executable instructions or pieces of software, firmware, or a combination thereof. The computing device 105 can include, an operating system (not shown) and one or more computer memories 115, such as a main memory, configured to store one or more pieces of data, either temporarily, permanently, semi-permanently, or a combination thereof. The memory 115 may include volatile memory, non-volatile memory, or a combination thereof. The computing device 105 can also include one or more storage mediums 120, such as a non-transitory computer-readable storage disk, main memory, cache, or flash memory, configured to store data in a semi-permanent or substantially permanent form.

In some implementations, the computing device 105 may include one or more other hardware components not shown in FIG. 1, such as for example, a display or monitor, a keyboard, a touchscreen, a camera, a mouse, a touchpad, a trackpad, a video processor, etc. Computing device 105 may also be in communication with one or more client computing devices, e.g., devices used by users to remotely execute application programs 140, to build and maintain application programs 140, to interact with the metadata UI 158, etc.

The object document RI system 100 also includes one or more databases 130 stored in one or more of storage mediums 120 (e.g., disk, tape, main memory) of the computing device 105. The database 130 can be any database that supports triggers and enforces referential integrity between tables. Triggers are user-defined (e.g., system administrator, database administrator, application programmer, etc. defined) procedures that the database system executes when certain database commands, e.g., insert, update, or delete statements, are issued against the associated database object. Triggers are not application specific, and are thus transparent to the executing application program 140. In a database, a table generally represents an object, with each row in the table being a separate instance of the object. Tables may, thus, be considered classes. Thus, for example, an employee object may be an instance of an employee class and be stored in a row of an employee table. In some implementations, the instances of a class may be formatted as an object data document, such as a JSON document, an XML document, etc. Such object data documents store information in attribute-value pairs. Thus, the database may store the data represented by the object data document in a row of a corresponding table.

Figure 2:
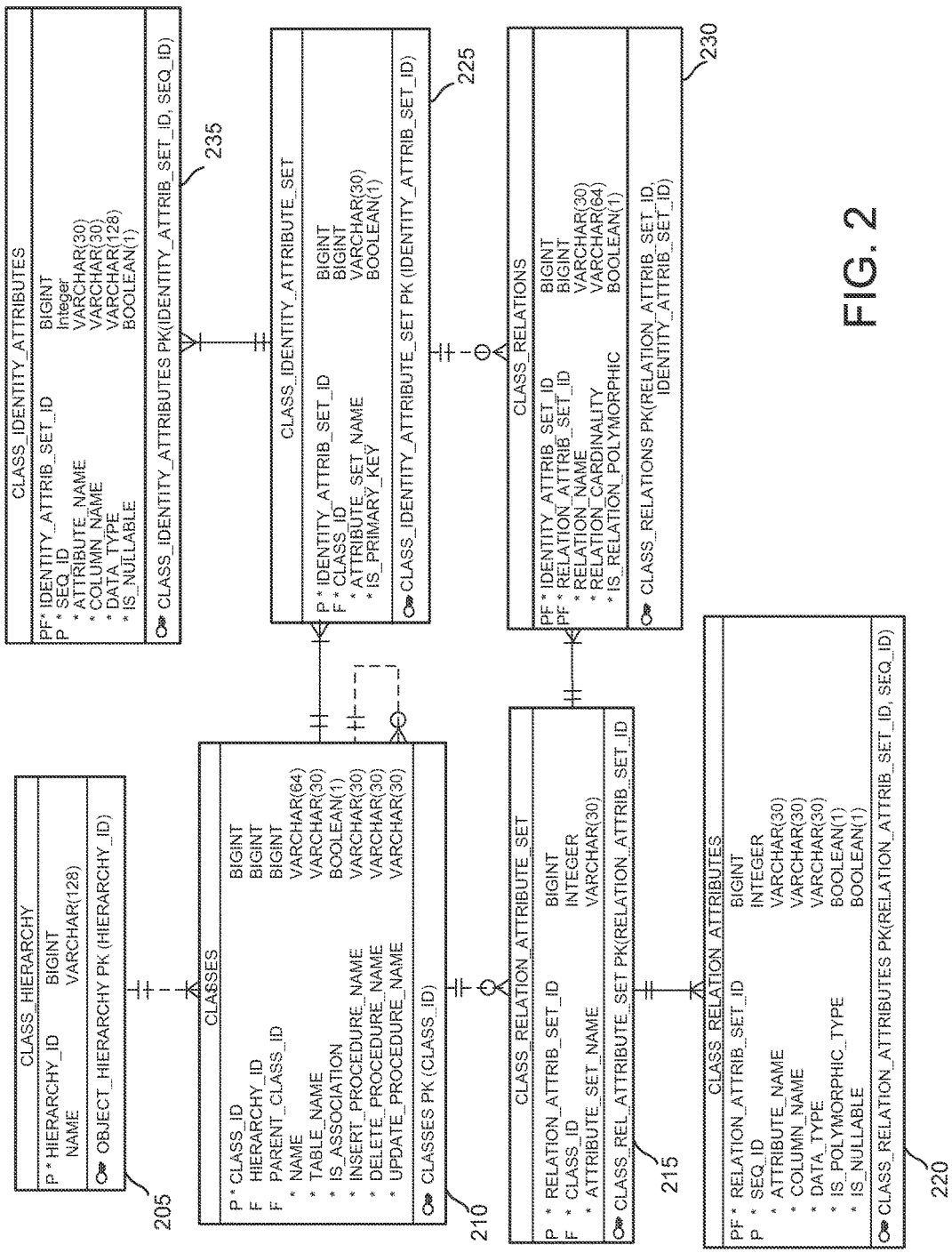
FIG. 2 is an example of an RI metadata framework for an object data document referential integrity system, according to an implementation.

Storage medium 120 may include a RI metadata library 156. The RI metadata library 156 includes a metadata definition layer that supports automatic generation of database structures to store object data documents in their entirety while enforcing referential integrity between objects in the object model. FIG. 2 illustrates one example of data elements used in a metadata definition layer of the metadata library 156. The metadata library 156 may allow an application programmer, database administrator, or other user to define a class hierarchy for database objects, for example using the class hierarchy definition 205. Each hierarchy may include one or more classes 210 as members of the hierarchy. Each class 210 may correspond to an object in an object model. Some classes 210 may represent association tables that are not separate objects in the object model, but facilitate N-ary (or many-to-many) relationships between two objects in the data model.

The class identity attribute set 225 identifies the attributes used in primary keys for the corresponding tables that are instances of the class, e.g. the tables onto which the underlying classes are persisted. Thus, the class identity attribute set 225 enables the system to generate the primary key for the table that persists the class instances. The primary key is made up of one or more identifying attributes in the object data document. In other words, an identifying attribute for a class uniquely identifies (or helps to uniquely identify) an instance of the class. Identifying attributes are a type of referential integrity attribute. Because the primary keys may include any number of fields, the key may be defined as a set, and the class identity attributes 235 may identify the individual fields that make up the set representing the primary key or foreign key.

The class relation attribute set 215 identifies the attributes from the object used in foreign keys. Thus, the class relation attribute set 215 enables the system to persist the attributes from the object used to relate the object to another object. These attributes are referred to as relationship attributes and are a type of referential integrity attribute. Put another way, a relationship attribute is an attribute that also exists in another class. A relationship attribute often uniquely identifies (or helps to uniquely identify) an instance of the other class, but a relationship attribute does not need to do so. Identifying attributes and relationship attributes are collectively referred to as referential integrity attributes. The relationship attribute may be part of a relation attribute set, stored in relation attribute set 215, so that a foreign key can include multiple attributes. The class relation attributes 220 may have an entry for each relationship attribute in a relation attribute set. The name of the attribute set may be used as the name of the foreign key. If a class has a referential integrity constraint it will have at least one entry in the class relation attribute set 215, with one or more corresponding entries in the class relation attributes 220. To support polymorphic relationships, class relation attributes 220 may also include a flag IS_POLYMORPHIC_TYPE that indicates the attribute persists the object type of the parent for a particular instance, as will be explained in more detail herein.

Class relations 230 maps identifying attributes of one table to relationship attributes of another table. Class relations 230 thus, enables the system to establish relationships between objects. The system may use the class relations 230 to build the structures, such as foreign keys and triggers, used by the RDBS to ensure referential integrity. Class relations 230 persists the cardinality of the relationship (e.g., one-to-many, many-to-many, one-to-one, zero-to-one, etc.) and whether the relationship is polymorphic. A non-polymorphic relationship is a relationship between two classes and does not include any other classes within the class hierarchy, and is thus not dependent on the value an attribute. A polymorphic relationship is a relationship between a class and any class of a class hierarchy and can represent a relationship between instances of a class and instances of any of the classes within a class hierarchy, depending on the value of an attribute in the object data document. To accommodate a polymorphic relationship in a relational database, the system may store the parent object type as a relationship attribute for the child object. For example, a tag class may have a relationship with a job class or a service class via an object_type relationship attribute. The value of the object_type attribute determines whether the parent of an instance of the tag object is a job object or a service object. The object_type is thus a relationship attribute of the tag class, and may be identified as specifying the type of the parent class. For example, when the is_polymorphic_type flag in class_relation_attributes 220 is TRUE the system knows the value of that attribute specifies the parent class for the instance. If the relationship is polymorphic, the system may build triggers to ensure referential integrity rather than create a foreign key constraint.

The RI metadata framework 200 may enable the automatic generation of relational database tables, indices, triggers, and/or other structures to enforce referential integrity between tables without any changes to application programs 140. In other words, the RI metadata framework 200 enables the application programs 140 to deal with data in terms of object data documents and not database tables and queries. The application programs 140 may use generic functions, for example that are part of the RI procedures 154, to access and change object instances. Because object data documents are language-independent, they can be supported by a variety of application programs 140 written in a variety of programming languages. The RI metadata framework 200 enables the system to hide the exact structure of the relational database 130 from application developers, so that the developers do not need make programming changes to accommodate changes in the underlying RDBS structures. Once the classes are defined, i.e., the RI metadata framework 200 is created for the classes, and the RI procedures 154 are in place, the application developers need only call generic procedures to access and update the object data documents. Not all changes to the classes, e.g., defined in object definitions 135, trigger changes to the metadata framework 200. For example, only changes to an existing relationship between classes or a new relationship between classes would trigger a change in the metadata framework. This further simplifies maintenance of the environment. It is understood that when a change of the class relationships occurs, the data in the RI metadata framework 200 represented in FIG. 2 correspondingly needs to be updated and database structures regenerated, for example via the RI framework initialization engine 150.

Returning to FIG. 1, storage medium 120 may also include metadata UI 158. The metadata UI 158 may be an interface that enables a user to update the RI metadata library 156 to reflect the object model, e.g., classes in the object definitions 135. The user may be a database administrator, a programmer, a systems administrator, or some other user involved in the development of the object definitions 135. In some implementations, the metadata UI 158 may use the object definitions 135 to prompt the user for input to populate the RI metadata library 156.

Once the RI metadata framework is established in the RI metadata library 156, the user may invoke the RI framework initialization engine 150. The RI framework initialization engine 150 may use the RI metadata library 156 to generate database structures in the database 130, to generate RI procedures 154, and to generate RI triggers 152. The RI framework initialization engine 150 may be configured to generate data definition language statements to create and alter tables in the database 130 to store the object data documents. Data definition language (DDL) statements are statements recognized by the database system 130 to create and alter database structures. Such statements may be database-specific, although many databases support a common syntax. The RI framework initialization engine 150 may also be configured to generate one or more stored procedures that extract values for referential integrity attributes from an object data document, format a data manipulation language statements for inserting, updating, and deleting data in the underlying tables, and to issue the statements. In some implementations, the application programs 140 may issue read operations directly against the database 130, and in some implementations, the RI framework initialization engine 150 may be configured to generate a stored procedure to issue read operations. Data manipulation language (DML) statements are the commands and syntax used by the database system to access and update the tables and columns. Structured Query Language (SQL) is one example of a data manipulation language, although such languages can be database system specific. By generating stored RI procedures 154 for each class, the system reduces the response time to fulfill a request (e.g., an insert, update, delete, read) because the system does not need to traverse the RI metadata framework in the RI metadata library 156 at the time of the request. In some implementations, instead of generating RI procedures 154 for each class in the RI metadata library 156, the RI framework initialization engine 150 may generate a generic insert procedure that uses the RI metadata library 156 to determine what attributes to extract at the time of an insert based on a class name passed as a parameter, and to use the RI metadata library 156 to generate the DML, although this increases the insert request response time. In such an implementation, the RI framework initialization engine 150 may generate a similar update, delete, and read procedure (with similar increased response times). Thus, in some implementations, the RI procedures 154 may include logic that is not specific to a class, but determines the referential integrity attributes for the class using the RI metadata library 156 at the time of a change, although this slows response time to the request. The system may execute the RI framework initialization engine 150 after initial set-up of the RI metadata library 156 and after any changes to data in the RI metadata library 156.

Storage medium 120 may also include one or more application programs 140. Application programs 140 may generate and access the object data documents stored in the database 130, e.g., may manipulate the data, report on the data, generate user-interfaces that allow a user to insert, modify, and delete the data etc. In manipulating and accessing the underlying data, the application programs 140 may call generic functions in RI procedures 154. The generic functions may in turn call class-specific RI procedures 154 based on the class identified in the object data document. In some implementations, the generic functions may call request-specific RI procedures 154 that use the RI metadata library 156 to generate class-specific database manipulation language statements.

Figures 8, 9:
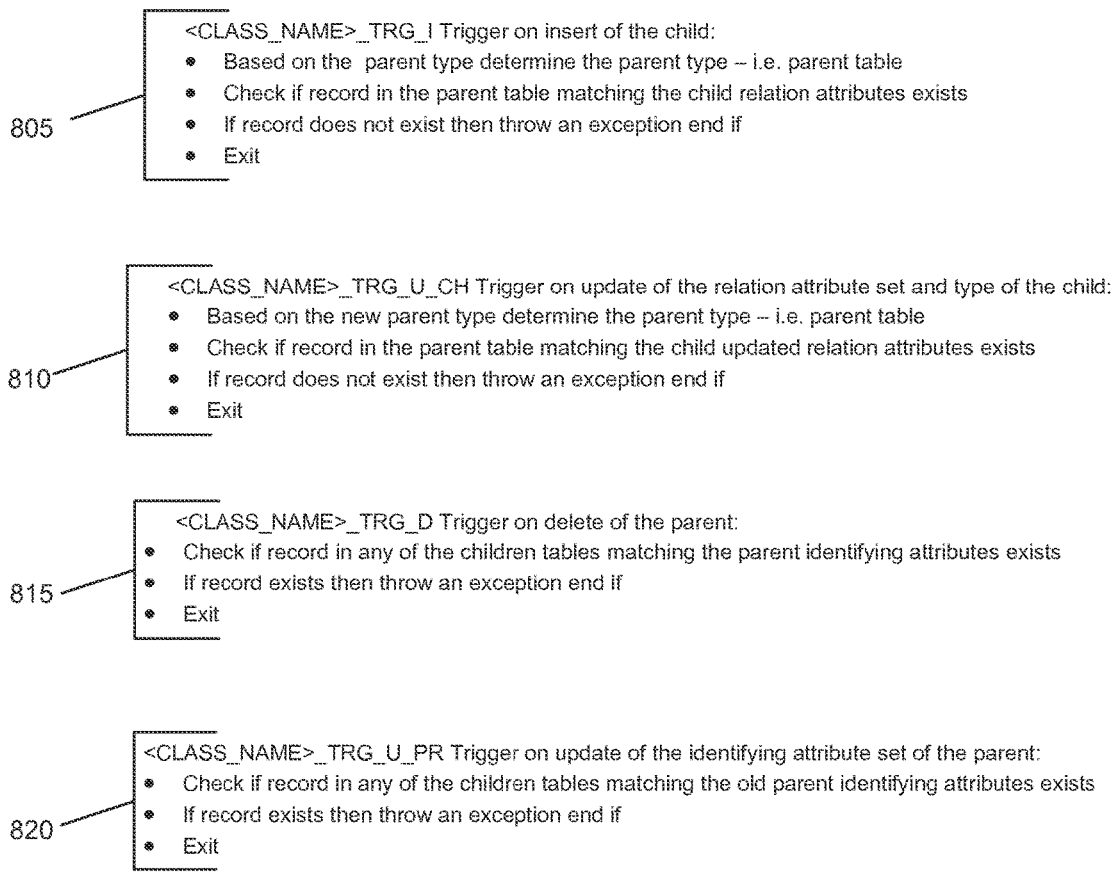
FIG. 8 illustrates example pseudo-code for database triggers generated to maintain referential integrity for polymorphic relationships in an object model, according to an implementation.
FIG. 9 is an example of pseudo-code for an extraction function that extracts a value for an identifying attribute from an object data document, according to an implementation.

Storage medium 120 may also include RI triggers 152. RI triggers 152 may include procedures invoked when an object data document has a polymorphic relationship. As noted above, the parent class of a polymorphic relationship can be different for each instance of the child class. Thus, the RI triggers 152 may be configured to determine which class is the parent class responsive to an insert or change of the child class and may determine whether the parent has a child upon deletion or update of the parent class. The RI framework initialization engine 150 may generate the RI triggers 152, as appropriate based on the information in the RI Metadata Library 158. FIG. 8 illustrates examples of RI triggers 152, according to some implementations.

FIG. 3 illustrates example object data documents and the database structures generated using the RI metadata framework, according to an implementation. Of course, the examples are for illustration only and implementations are not limited to the examples shown. In the first example, the object data document 305 is a JSON document for an employee object. The employee in the object data document is assigned to three tasks, a task being another object type. For this example, the RI metadata framework may include an employee class, a task class, and an association class of tasks_employees. The association class facilitates a many-to-many relationship between employees and tasks and may exist in the RI metadata framework but not the object model (e.g., Object Definitions 135 of FIG. 1). In the example of the object data document 305, the employee class and its associated referential integrity attributes are stored in an employee table 310, the task class and its referential integrity attributes are stored in a task table 320 and the association class and its referential integrity attributes are stored in a tasks_employees table 315. The employee table 310 includes an employee identifier column as the primary key (which will be an identifying attribute from class_identity_attributes 235) and a CLOB column to hold the entire object data document 305 for the employee object. The tasks table 320 includes the task identifier as a primary key (which will be an identifying attribute from class_identity_attributes 235) and a CLOB column to hold an object data document (not illustrated in FIG. 3) representing the task. The tasks_employees table 315 represents an association class and therefore does not have a corresponding object data document or a corresponding CLOB column. The tasks_employees table 315 is generated to facilitate the many-to-many relationship between tasks and employees. The tasks_employees table 315 enables the employee table 310 to have a one-to-many relationship with the task_employees table 315 and the tasks table 320 to have a one-to-many relationship with the task_employees table 315. The task_employees table 315 includes a column for each field in the primary key in the two classes it relates, in this example the task identifier and the employee identifier. Because these two fields together are the primary key, the corresponding RI metadata framework may have these fields stored in the same class_identity_attribute_set 225, each with a different sequence number in class_identity_attributes 235. An association class will typically lack a CLOB column for an object data document, because it is created for the purposes of relating two classes only, and not for persisting an object data document. It is understood that CLOB is used as an example of a data type that can be used to hold the object data documents, but that another data type, such as text, may be used to store the employee and task objects. Thus, implementations are not limited to CLOB data types.

In addition to the primary key, the tasks_employees table 315 includes two foreign keys, one referencing the employee id column in the employees table 310 and another referencing the task identifier in the tasks table 320. Accordingly, the task_id and emp_id are also relationship attributes for the tasks_employees table 315 and stored in class_relation_attributes 220. However, the emp_id attribute from class_relation_attributes 220 is related to a first class_relation_attribute_set 215 and the task_id attribute from class_relation_attributes 220 is related to a second, separate class_relation_attribute_set 215. Thus, the tasks_employees table 315 has two different relation attribute sets. This enables the system to generate the two different foreign keys. For example, class_relations 230 metadata may include an entry that has the emp_id from the employees table 310 as the identity_attrib_set_id and the emp_id from the tasks_employees table 315 as the relation_attrib_set_id, which creates the foreign key for tasks_employees that references the employee table 310. In addition, the class_relations 230 may include the task_id from the tasks table 320 as the identity_attrib_set_id as the task_id from the tasks_employees table 315 as the relation_attrib_set_id, which creates the foreign key for the tasks_employees table 315 that references the tasks table 320. This ensures that a task instance is not deleted if an employee instance is still assigned to the task, and vice versa. The foreign key constraints will be created when the relationship is not polymorphic (unless and until relational databases offer foreign key constraints for polymorphic relationships).

In a second example illustrated in FIG. 3, the object data document 350 is an XML document for a pod object. The pod has an associated location, which is itself another object. In this example, the metadata framework may include a pod class and a location class, which result in the creation of the pod table 355 and the location table 360. The pod table 355 has a pod identifier for a primary key (which will be an identifying attribute from class_identity_attributes 235) and a location identifier as a relationship attribute (which will be a class_relation_attribute 220). The location table 260 has a location identifier as the identifying attribute and, thus, a primary key. The metadata may specify that the location identifier in the pod class is related to the location identifier in the location class, for example via the class_relations structure 230 of FIG. 2. The cardinality may be one to many (e.g., each pod has one location, but each location may be associated with many pods). This enables the system to build the foreign key for the pod table 355.

Figure 4:
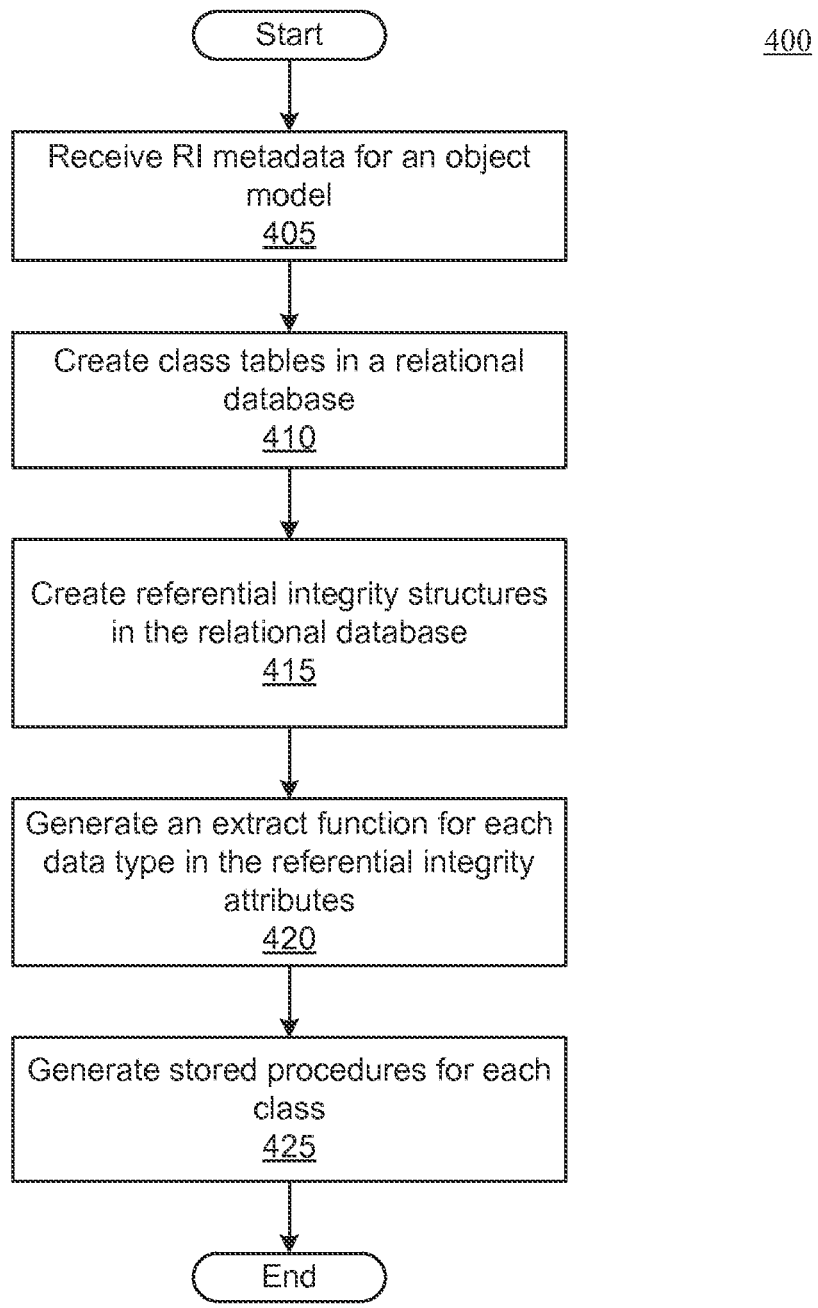
FIG. 4 is a flowchart illustrating an example process for building the relational database structures to enforce referential integrity in an object model, according to an implementation.

FIG. 4 is a flowchart illustrating an example process 400 for building the relational database structures to enforce referential integrity in an object model, according to an implementation. Process 400 uses a referential integrity metadata framework to build relational database structures to store object data documents in their entirety while enforcing referential integrity in relationships between the objects. In some implementations, the process 400 may be executed by a system running an RI framework initialization engine, such as engine 150 of system 100 of FIG. 1. Process 400 may begin by receiving the RI metadata for an object model (405). The RI metadata may be an example of the RI metadata framework 200 illustrated in FIG. 2. In some implementations, the system may include a user interface, such as metadata UI 158 of FIG. 1, that enables a user to provide the RI metadata. In some implementations, the system may access the RI metadata via a network. For example, the RI metadata may be stored on another computing device or on a computer storage device accessible to the system. In some implementations, the RI metadata may be sent to the system.

The system may use the RI metadata to create class tables in the relational database (410). The tables persist the object data documents and referential integrity attributes used for establishing the relationships between the classes. Generation of the class tables using the RI metadata is described in more detail with regard to FIG. 5. The system may also use the RI metadata to generate referential integrity structures in the relational database (415). Referential integrity structures include foreign keys for non-polymorphic relationships and RI triggers for polymorphic relationships. The generation of RI structures is discussed in more detail with regard to FIGS. 7 and 8. The system may also generate an extract function for each unique data type of the referential integrity attributes (i.e., the relationship attributes and the identifying attributes) (420). In some implementations, the extract functions may be stored, for example, as part of RI procedures 154 of FIG. 1. This step may be optional when, for example, the system has already run process 400 at an earlier time because data types are limited and it is likely the extract function for a particular data type will have already been created by the earlier run process 400. In some implementations, the system 100 may also re-create the extract functions. The extract functions are discussed in more detail below with regard to FIG. 9.

The system may also generate stored procedures for each class (425). In some implementations, the system may generate three stored procedures for each class; one for inserting an instance, one for deleting an instance, and one for updating an instance. In some implementations, the system may optionally generate a fourth stored procedure for reading an instance from the database. The name of each procedure may be stored as part of the class metadata in the RI metadata framework. For example, the insert stored procedure may be stored in the insert_procedure_name field of classes 210 of FIG. 2. The generated procedures may maintain persistence of the object in the relational database through actual inserts, updates, and deletes within the underlying tables. The RI constraints (e.g., foreign keys and database triggers) maintain the referential integrity of class relationships. For example, if an application issues a request that would break the referential integrity of the object model, the data access layer of the database will throw an exception, preventing the successful completion of the request, ensuring high data quality is maintained. Process 400 completes when stored procedures have been generated for the classes in the RI metadata framework.

FIG. 5 illustrates example pseudo-code for using the RI metadata framework to generate example data definition language (DDL) statements that build relational database tables to persist object data documents for and enforce referential integrity in an object model, according to an implementation. The pseudo-code is an example of the system using an RI metadata framework, such as RI metadata framework 200 of FIG. 2, to generate tables in a relational database as part of step 410 of FIG. 4. The pseudo-code 500 illustrates how the system may build a data definition language statement 550 that generates the tables. In the example of FIG. 5, the DDL statement 550 generates the pod table 355 of FIG. 3. In the DDL statement 550, text shown in bold represent values inserted from the metadata framework. The remaining text is hard-coded in the pseudo-code.

In generating the DDL statement, the system may initialize the DDL statement with a "create table" command and append the table name of the table to be created, for example taken from classes 210 in the RI metadata framework (552). For each class_identity_attribute set 225 for the class 210, the system may obtain the corresponding class_identity_attributes 235 records. Each class_identity_attribute 235 may represent a column in the table, so the system may append the column_name and data_type from the class_identity_attributes 235 to the DDL statement (554). The system may next append "NULL" or "NOT NULL", depending on the flag IS_NULLABLE in the class_identity_attributes (556), and append a comma if there is more than one class_identity_attributes 235 record for the class_identity_attribute_set 225. The system may append any additional columns from class_identity_attributes 235 for the class_identity_attribute_set 225, if any exist. The system may repeat the above loops using the class_relation_attribute_set 215 and the class_relation_attributes 200, appending additional columns for the class (558), when unique columns exist. Uniqueness may be determined by comparing the column_name attribute in class_identity_attributes 235 and class_relation_attributes 220. For example, for association classes the identifying attributes may also be stored as relationship attributes, and the entries in the class_relation_attributes 220 may not represent unique columns, as the same column names appear in class_identity attributes 235 for association classes. It is thus understood that the same attribute may be in both the identity attribute set and the relation attribute set, as discussed above with regard to FIG. 3. Thus, the system may have checks to make sure a duplicate attribute is not appended in the DDL statement.

As illustrated in the pseudo-code of FIG. 5, the system may append an object_body column to hold the object data document for the table in a CLOB or similar field (560).

Each table that is not an association table (e.g., the is_association flag is FALSE in classes 210) may have the object_body column appended to the DDL statement. The system may then append the create table terminators, in this example a closing parenthesis and semi-colon. The system may then append commands to generate the primary key for the table. For example, the system may append an ALTER statement to add a constraint (562). The system may look in the class_identity_attribute_set 225 for the attribute set that is the primary key for the class and add the name of the primary key, e.g., the attribute_set_name from class_identity_attribute_set 225, to the DDL statement (564). The system may then read the columns from the class_identity_attributes 235 for the set of columns that make up the primary key, appending each attribute name to the DDL statement (566) along with a comma if the column is not the last primary-key identifying attribute. When all primary key columns have been appended, the system may append a terminator for the primary key column list (568) (e.g., an end parenthesis and semi-colon). The system has generated a DDL statement that sets up relational database tables according to the relational integrity metadata framework. In other words, pseudo-code 500 demonstrates how the system can use the RI metadata framework to generate the structures in the relational database to support referential integrity for object data documents while preserving the object data document.

Figure 6:
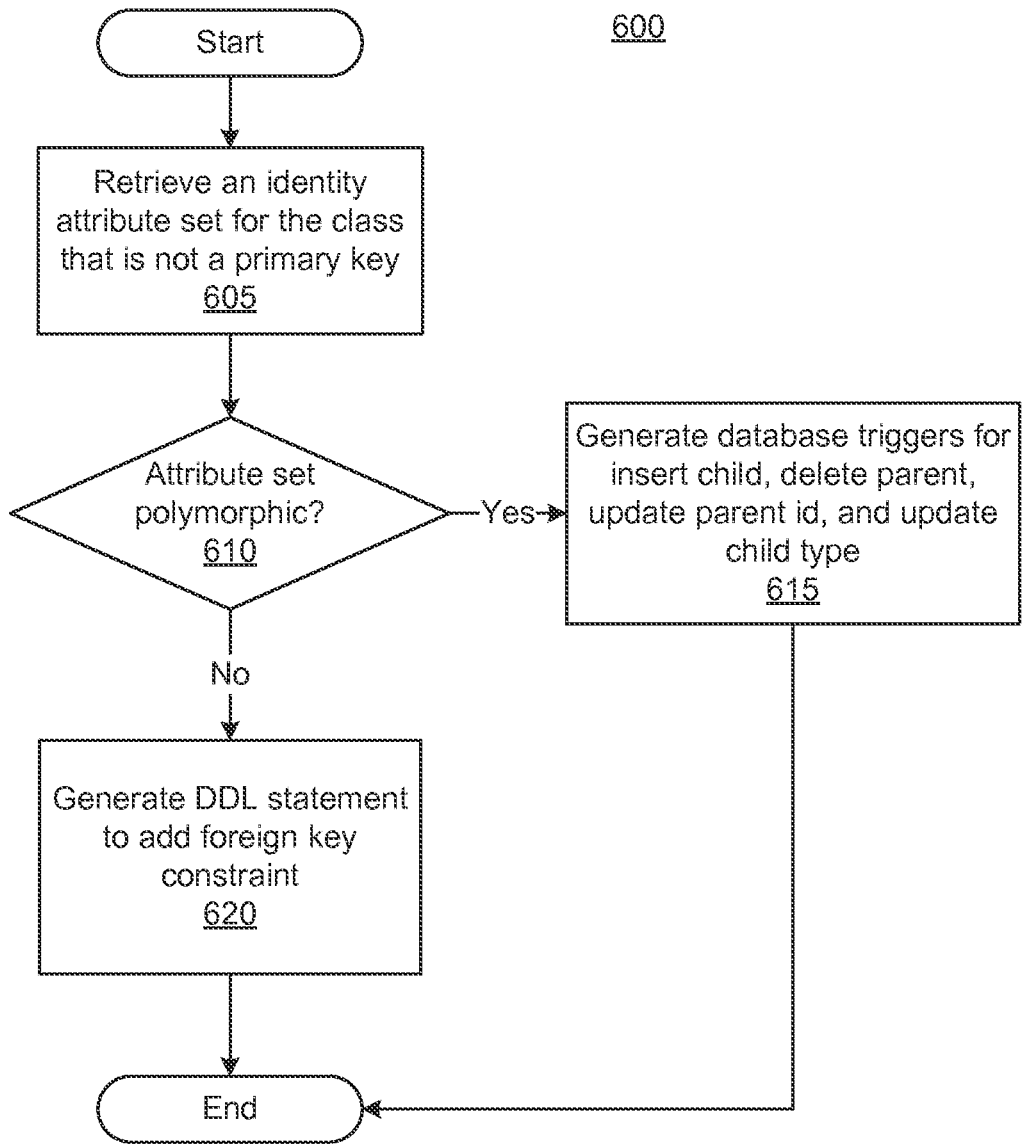
FIG. 6 is a flowchart illustrating an example process for generation of referential integrity structures in the relational database, according to an implementation.

FIG. 6 is a flowchart illustrating an example process 600 for generation of referential integrity structures in the relational database, according to an implementation. Referential integrity structures include table attributes or triggers that enable the database to enforce referential integrity constraints. Foreign keys are an example of a referential integrity structure. RI triggers are also examples of a referential integrity structure, used for database systems that do not allow foreign keys for polymorphic relationships. The system may use the metadata framework to determine which identifying attributes are not primary keys and use these attributes to set up the referential integrity structures. In some implementations, process 600 may be performed as part of step 415 of FIG. 4. Process 600 represents a process for one class, but it is understood that process 600 may be repeated for each class in the RI metadata framework.

Process 600 begins with the system retrieving the identity attribute set for the class that is not a primary key (605). The system then determines whether the identify attribute set is polymorphic or not (610). In some implementations, the class_relations metadata, e.g., class_relations 230, may specify whether a relationship between an identifying and a relationship attribute is polymorphic. If the relationship is polymorphic (610, Yes), the system may generate database triggers (615). In a polymorphic relationship, the child class may have one attribute that identifies the type (e.g., the class) of the parent class for the particular instance of the child. This is because the child class can have different classes as parents. The system may generate triggers to ensure that child instances are not orphaned (e.g., ensuring the corresponding parent instance is not deleted or does not exist). In some implementations, the system may generate a trigger for insertion into the child table, for deletion of the parent table, for update of the parent table, and for update of the child table.

In the case of many-to-many polymorphic relationships, the system may build a corresponding association table, as with the non-polymorphic many-to-many relationships. The association table may be created with columns that identify the parent type. The additional columns may depend on the number of the polymorphic parents. For example, in the case of a simple N:N relationship, the system may add 1 or 2 additional attributes, depending on the polymorphic relationship characteristics. In other words, the relationship may be polymorphic-single-sided or polymorphic-double-sided. The system may generate RI triggers for all polymorphic parents (e.g., in an N:N relationship, both parents of the polymorphic relationship) and the association table. The system may use foreign key constraints for non-polymorphic parents of an N-ary relationship.

FIG. 8 illustrates example pseudo-code for triggers generated to maintain referential integrity for polymorphic relationships in an object model, according to an implementation. Trigger 805 represents a child insert trigger, trigger 810 represents a child update trigger, trigger 815 represents a parent delete trigger, and trigger 820 represents a parent update trigger. The name of the trigger 805 and the trigger 810 may be taken from the name in the class metadata table for the child. For example, a polymorphic relationship may exist where a tag class can have either a job class or a service class as a parent, with the tag class being the child class in this example. The metadata describing the tag class may include a gen_object_id attribute (e.g., in class_relation_attributes 220), which is the identifier of either a job class instance or a service class instance. The tag class may also include an object_type attribute that identifies the gen_object_id as either a job instance identifier or a service instance identifier. For example, in some implementations, the object_type may be the class name or the class_id for the parent class. In other words, in a tag class instance, the value of the object_type attribute indicates the parent class corresponding to the value of the gen_object_id. The name of the tag class from the classes 210 metadata is used as the <CLASS_NAME> in triggers 805 and 815. The system invokes trigger 805 upon an insert of a row in the table for the tag class and invokes trigger 810 upon an update of a row in the table for the tag class. Each ensures that the corresponding parent exists or throws an exception.

The metadata specifying the relationship between objects, e.g., class_relations 230 may include a flag indicating whether the relationship is polymorphic. As previously discussed, class_relations 230 includes the identity_attrib_set_id of the parent class and the relation_attrib_set_id of the child class. In some implementations, at least one of the relationship attributes (e.g., in class_relation_attributes 220) for the relation_attrib_set_id in a polymorphic relationship may be marked as a polymorphic type (e.g., via is_polymorphic_type set to TRUE). As discussed above, this is the relationship attribute that identifies the object type of the parent for a particular instance. Accordingly, the system may use the value of this attribute in the child table to determine, in the trigger, which parent table to access. For example, if a new tag instance is inserted into the tag table in a relational database, the value of the object_type attribute (e.g., the object_type column in the tag table) represents either a job object or service object. For example, in some instances the value may specify the name of the table, the name of the class, or include the class identifier or a table identifier. The system may generate trigger 805 in such a way as to use the value of the object_type attribute to access the appropriate table and verify that the table includes an entry matching the gen_object_id attribute value from the tag instance. If the table does not include a matching entry, the trigger may throw an exception that cancels the insert or update request. Of course, the examples provided above are examples only other methods may be used to identify the type of the parent object, for example using the metadata framework.

Similar to the child triggers, the system may generate a delete parent trigger 815 and an update parent trigger 820 for each possible parent class. The system may generate the delete parent trigger 815 and the update parent trigger 820 so that the system checks for instances of the child class before doing the delete or an update of the identifying attribute for the parent. Modifying other columns in the parent besides the identifying attribute will not orphan a child and do not need to be checked. Using the example above, the system may generate triggers 815 and 820 for the job class and may generate triggers 815 and 820 for the service class. The <CLASS_NAME> in triggers 815 and 820 may be replaced by the class name in the classes 210 metadata for the job class and the service class. The system may generate the triggers so that when invoked, the trigger may cause the system to look for any child instances referring to the parent. Using the example above, the trigger for the job table may look for a tag table record that has an object_type that indicates the gen_object_id is a job and where the value of the gen_object_id matches the primary key of the job (e.g., the job_id to be deleted or changed). If such a tag instance does exist, the system may throw an exception, cancelling the deletion or the update. The system may generate a similar trigger for the service table. It is understood that in some implementations, the separate insert and update triggers on the child could be combined into a single trigger. Likewise, the separate update and delete triggers on a parent table could be combined in a single trigger. Thus, implementations are not limited to the format of the example triggers illustrated in FIG. 8.

Returning to FIG. 6, if the relationship is not polymorphic (610, No), the system may generate foreign keys to enforce referential integrity (620). Process 600 is then complete for the table. It is understood that process 600 may be repeated for any number of tables identified in the RI metadata framework, for example in classes 210.

FIG. 7 illustrates example pseudo-code 700 for using the metadata data model to generate an example data definition language (DDL) statement 750 that builds foreign keys for non-polymorphic relationships in the object model, according to an implementation. The pseudo-code 700 is an example of the system using an RI metadata framework, such as metadata framework 200 of FIG. 2, to generate tables in a relational database as part of step 620 of FIG. 6. The pseudo-code 700 illustrates how the system may build a data definition language statement 750 that generates foreign key constraints for the tables in the database, e.g. the tables generated by the pseudo-code of FIG. 5. In the example of FIG. 7, the DDL statement 750 generates foreign keys for the tasks table 320 of FIG. 3. In the DDL statement 750, text shown in bold represent values inserted from the RI metadata framework. The remaining text is hard-coded in the pseudo-code. It is understood that the DDL statement is exemplary only and that the example may be used to generate appropriate DDL statements, depending on the specific database implementation. It is also understood that the pseudo-code of FIG. 7 is for one table, but may be used to generate foreign keys for all appropriate tables.

In generating the DDL statement, the system may look for a non-primary key, non-polymorphic identity attribute set. Using the example RI metadata framework of FIG. 2, the system may look for a class_identity_attribute_set 225 this is not primary and find that identity attribute set in the class_relations 230 metadata to determine if the relationship is polymorphic. If it is not, the system may initialize the DDL statement with an "alter table" command (752). The table name is not appended yet, as the system needs to determine the child table. Accordingly, the system may use the class_relations 230, which specifies the relationship between the parent and child class, find the class_relation_attribute_set 215 that corresponds to the relation_attrib_set_id in class_relations 230, and find the classes 210 metadata of the child. Once the system identifies the child metadata, the system may append the name of the child table to the DDL statement (754). The system may then append a command to add a constraint with the name identified as the relation name in the class_relations 230 metadata as the foreign key (756). The system may then look for the class_relation_attributes 220 that correspond to the child and append these attributes (e.g., the column names) to the DDL statement (758). When all relationship attributes have been appended, the system may append the referencing statement, e.g., identifying the parent table (760). The system may then use the RI metadata framework to get the attributes of the parent (e.g., the column names) that correspond to the relationship attributes of the child. The system may append these attributes to the DDL statement (762) and close the DDL statement (764) when all identifying attributes of the parent have been appended. FIG. 7 thus illustrates how the system generates a DDL statement to add RI constraints for a non-polymorphic relationship. Although the example of FIG. 7 illustrates one alter statement, it is understood that pseudo-code 700 can be used to generate multiple alter statements for a table, if needed, and can be used to generate alter statements as needed to ensure referential integrity between the tables.

FIG. 9 is an example of pseudo-code 905 for an extraction function that extracts a value for an identifying attribute from an object document, according to an implementation. The system may generate an extraction function, for example, as part of step 420 of FIG. 4, based on the data type of relationship attributes and identifying attributes in the RI metadata framework. The pseudo-code of FIG. 9 is generic in that the data type may be replaced for each extract function by valid date types, such as integer, Boolean, VARCHAR, BIGINT, etc. The extract function may include an attribute name and an object body as parameters. The attribute name is used to search the attribute-value pairs in object data document for a matching attribute. Once the attribute is found, the pseudo-code 905 returns the corresponding value. In this manner, an extract function enables the system to find the values for identifying attributes and relationship attributes from the object data document, which still keeping the object data document intact.

Figure 10:
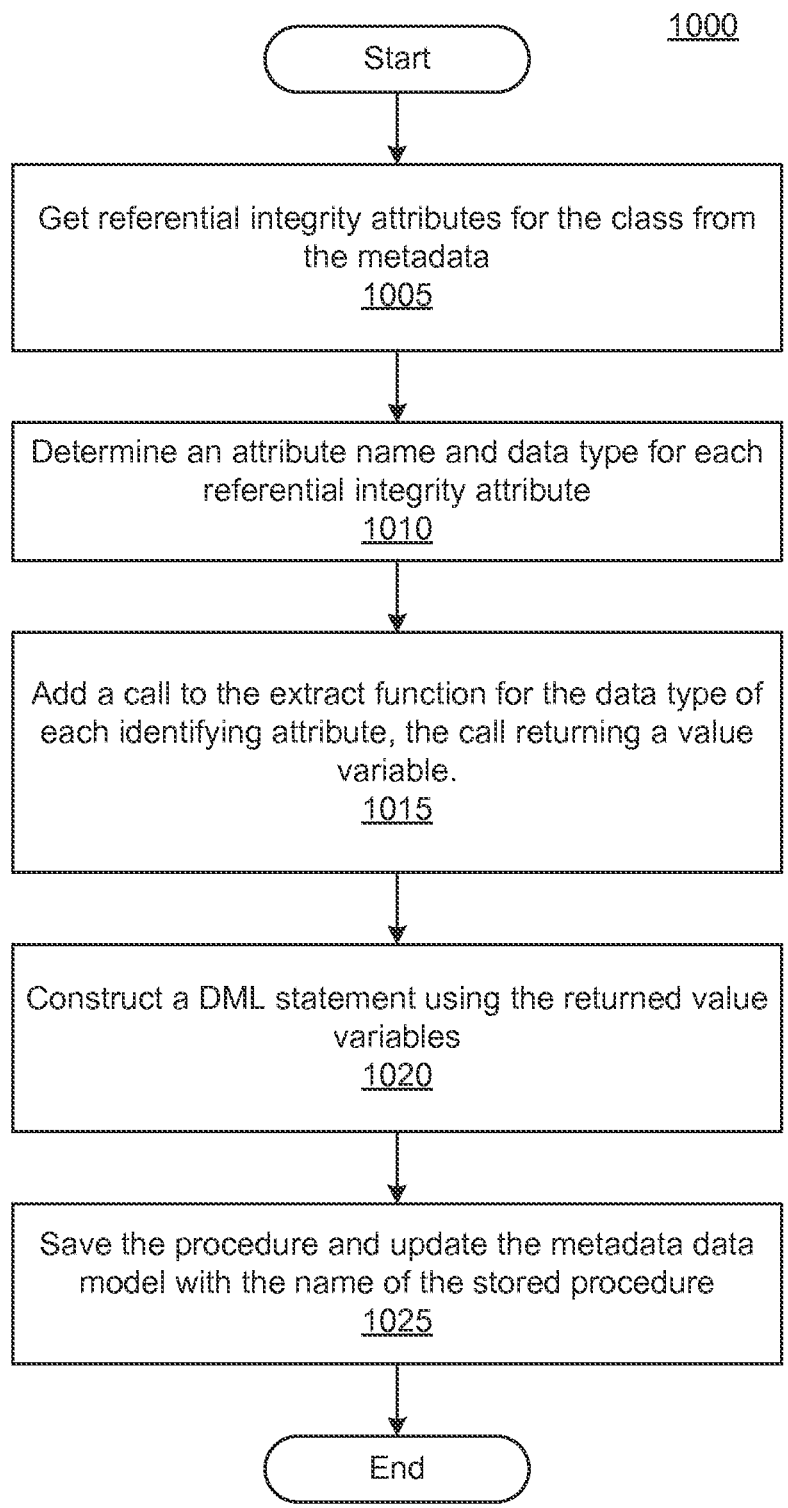
FIG. 10 is flowchart illustrating an example process for generation of stored procedures to enforce referential integrity in an object model, according to an implementation.

FIG. 10 is flowchart illustrating an example process 1000 for generation of stored procedures to enforce referential integrity in an object model, according to an implementation. In some implementations, process 1000 may be performed as part of step 425 of FIG. 4. Process 1000 represents a generic process for single class, but it is understood that process 1000 may be repeated for each class in the RI metadata framework. In some implementations, the system may execute process 1000 for separate operations, for example, generating a stored procedure for an insert, a stored procedure for an update, and a stored procedure for a delete of a table. In such implementations, the system may generate three stored procedures for each class. In some implementations, the system may generate one stored procedure for each class with logic that generates DML statements for one of the three operations. For example, the system may generate one procedure but step 1020 may include an if, switch, case, or similar logic statement that selects one of three types of DML statements to generate, e.g., an insert DML, an update DML, or a delete DML, depending on a parameter passed to the stored procedure.

To generate the stored procedure for a table, the system may get attribute names for the identifying attributes (e.g., the primary key) and the relationship attributes for the table from the metadata (1005). Other attributes in the object data document are not extracted. The identifying attributes may be specified in the class_identity_attributes_set/class_identity_attributes metadata and the relationship attributes may be specified in the class_relation_attributes set/class_relation_attributes metadata. The attribute name and data type may be obtained from the metadata (1010) and used to generate a call to appropriate extract functions (1015). For example, the system may call the extract function once for each referential integrity attribute using the attribute name as a parameter. The system may use the data type to determine the correct extract function to call. Each call to the extract function may return a value variable. The value variable will hold the value from the object data document that corresponds to the attribute name passed as a parameter. The system may use these value variables and attribute names to construct appropriate DML statements (1020).

For example, the system may generate an insert stored procedure. The insert stored procedure for a class is configured to insert a record into the table persisting the referential integrity attributes and the object data document. If the table has a polymorphic relationship, the insert stored procedure for the table may also populate the parent object type in an object_type column in the child class, which invokes the trigger corresponding to an insert of a child, as discussed above with regard to FIG. 8. The object_type column is considered a relationship attribute. An example of a DML statement for an insert in the pod table 355 of FIG. 3 is "insert into pod values (:pod_val, :loc_val, "object_data_doc)" where :pod_val is the value variable corresponding to the pod_id, :loc_val is the value variable corresponding to the loc_id, and "object_data_doc is the object data document passed to the stored procedure.

The system may generate an update stored procedure. An update stored procedure also extracts the referential integrity values from the attribute-value pairs in the object data document. The update stored procedure is configured to update the record in the table persisting the referential integrity attributes and the object document. If the table has a polymorphic relationship, the update stored procedure for the table also updates the object_type relationship attribute. An example of a DML statement for an update to the tasks table 320 of FIG. 3 is "update tasks set object_body=:object_data_doc where task_id=:task_val" where :task_val is the value variable corresponding to the task_id and :object_data_doc is the object data document passed to the stored procedure.

The system may generate an update stored procedure. The delete stored procedure may delete the record persisting the object from the corresponding table. When the table includes an N-ary relationship (e.g., many-to-many), the delete stored procedure is also configured to delete corresponding records in the association table. An example of a DML statement for a delete in the employees table 310 of FIG. 3 is "delete from tasks_employees where emp_id=:emp_val; delete from employees where emp_id=:emp_val;". The system may delete records from the association table prior to deleting the records in the employee table to ensure the system does not throw an exception.

In some implementations, the system may also generate a retrieval stored procedure. Retrieval from the tables can be accomplished via SQL statements and returning the object-_body column. In some implementations, the SQL statements may be included in a stored procedure for the object, but the SQL statements can also be placed in the calling application. The identifying attributes may be used in the SQL statement predicate and joins between objects based on identifying attributes or relationship attributes could also be used. Of course, in some implementations, the calling application program may generate the SQL statements to access the object in the data base.

Returning to FIG. 10, the system may save the stored procedure(s), for example in RI procedures 154 of FIG. 1, and update the RI metadata framework to reflect the name of the stored procedures (1025). In this manner the system may enable the system to call the correct procedure from a generic routine called by the application program. Process 1000 then ends. It is understood that the stored procedures may be separate processes stored in the same library, or may be stored as separate libraries. It is also understood that the insert, update, and delete stored procedures may be in the same procedure, e.g., a procedure that calls the appropriate extract function(s) to obtain value variables for each referential integrity attribute and then uses a parameter to determine whether to build an insert DML statement, an update DML statement, or a delete DML statement based on the parameter.

Figure 11:
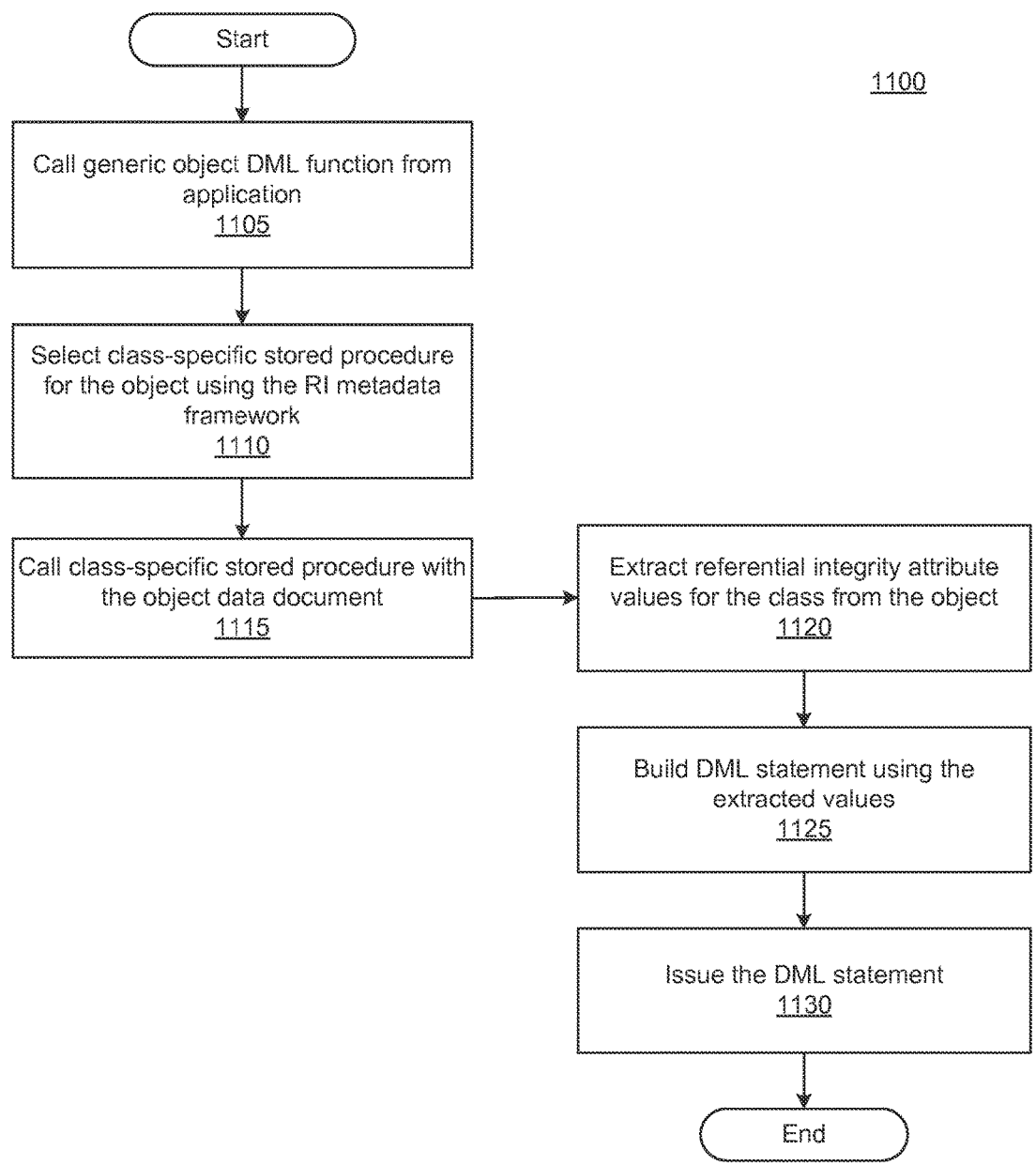
FIG. 11 is an example process for using stored procedures to enforce referential integrity in an object model, according to an implementation.

FIG. 11 is an example process 1100 for using stored procedures to enforce referential integrity in an object model, according to an implementation. Process 1100 uses the referential integrity metadata framework to call the correct stored procedure to change an instance of the object data document (i.e., update, delete, or insert a record in the table that persists the object data document. In some implementations, the process 1100 may be executed by a system such as system 100 of FIG. 1. Process 1100 may begin with a call to a generic object DML function from an application (1105), such as application 140 of FIG. 1. The generic object DML function may be for a particular operation (e.g., an insert operation, an update operation, or a delete operation). In some implementations, the generic object DML function may be a stored procedure, for example in RI procedures 154 of FIG. 1. The call to the generic object DML function may include an object data document and a class name as a parameter. For example, the application program may call a generic object insert process using the function call "INSERT_OBJECT(class_name varchar, object_body CLOB)". A similar function call may be used to delete an object and update an object. The generic object DML function may select a class-specific stored procedure for the object data document using the RI metadata framework (1110), such as metadata framework 200 of FIG. 2. For example, the generic object DML function may determine the class using the class name and obtain the class-specific stored procedure from the procedure names in the class metadata. The generic object DML function may then call the class-specific stored procedure passing the object data document a parameter (1115).

The system may begin execution of the stored procedure, which extracts referential integrity attribute values for the class from the object data document (1120). The stored procedure may extract the values for identifying and reference attributes via extraction functions, as described above with regard to FIG. 9. Each referential integrity attribute may thus have a corresponding value variable provided by an extract function. The stored procedure may cause the system to build an appropriate DML statement using the referential integrity attribute values (1125) and issue the DML statement (1130). This enables the relational database to update the appropriate tables and will enforce the relationships represented by the referential integrity contestants set up via the RI metadata framework. Process 1100 then ends. It is understood that some implementations may not use stored procedures, but may use a process similar to process 1000 to generate the DML statement at request time. Such implementations may have a slower request response time.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps are not limited to the order illustrated by example processes herein.

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
generating a first data definition language statement, based on a class defined in a referential integrity metadata framework, that creates a table in a relational database system to store an object data document, the table including:
at least one column that corresponds to an identifying attribute in the object data document,
at least one column that corresponds to a relationship attribute in the object data document, and
a column that stores the object data document;
generating a second data definition language statement, based on the referential integrity metadata framework, that creates a foreign key constraint on the at least one column that corresponds to the relationship attribute when the relationship is not polymorphic; and
issuing the first data definition language statement and the second data definition language statement to generate relational database structures that persist object data documents and relationships between object in different object data documents.

2. The method of claim 1, further comprising:
determining unique data types for the identifying attribute and for the relationship attribute; and
generating extraction functions corresponding to respective unique data types, the extraction function taking a referential integrity attribute and an object data document as parameters and returning a value corresponding to the referential integrity attribute from the object data document, the value having a type corresponding to the data type.

3. The method of claim 1, further comprising:
generating a stored procedure for the class configured to:
extract a first value corresponding to the identifying attribute from the object data document,
extract a second value corresponding to the relationship attribute from the object data document,
construct a data manipulation language statement using the first value and the second value, and
issue the data manipulation language statement; and
associating an identifier for the stored procedure with the class in the referential integrity metadata framework.

4. The method of claim 1, wherein the class is a first class and the relationship attribute is an identifying attribute for a second class defined in the referential integrity metadata framework.

5. The method of claim 1, further comprising:
receiving a request from an application program to insert a new object data document;
extracting a first value corresponding to the identifying attribute from the new object data document;
extracting a second value corresponding to the relationship attribute from the new object data document;
constructing a data manipulation language statement using the first value and the second value that inserts a record into the table; and
issuing the data manipulation language statement, wherein the data manipulation language statement causes the relational database system to check the foreign key constraint prior to successfully inserting the record.

6. The method of claim 5, further comprising:
determining, using the referential integrity metadata framework, an identifier for an insert stored procedure for the class; and
calling the insert stored procedure, the insert stored procedure performing the extracting, constructing, and issuing.

7. The method of claim 1, wherein the class is a first class, the table is a first table, and the identifying attribute is a first identifying attribute, and the method further comprises:
determining whether a relationship between the relationship attribute and a second identifying attribute for a second class is polymorphic;
when the relationship is not polymorphic: generating the second data definition language statement and issuing the statement; and
when the relationship is polymorphic, generating a database trigger invoked when a row is inserted into the first table, the row including a new object data document in its entirety and the trigger being configured to:
extract a first value from the new object data document for the relationship attribute,
determine a parent class for the relationship attribute from the object data document,
determine a second table, using the referential integrity metadata framework, for the parent class,
determine if the second table includes a row having a second value in a column corresponding to the second identifying attribute that matches the first value, and
prevent the insertion of the row into the first table when the second table does not include the row having the second value.

8. A system comprising:
at least one hardware processor;
at least one database environment, the database environment supporting triggers and foreign keys;
at least one application program; and
memory storing:
a referential integrity metadata framework that:
identifies classes in a hierarchy of objects,
identifies, for each class, at least one identifying attribute of the class,
identifies, for at least some classes, at least one relationship attribute for the class, and
identifies, for each relationship attribute, a relationship with a corresponding identifying attribute in another class, and
an initialization module configured to use the referential integrity metadata framework to:
generate tables in the database environment based on the referential integrity metadata framework, each table corresponding to a class in the referential integrity metadata framework,
generate primary keys for the tables based on the identifying attributes,
generate referential integrity structures based on the relationship attributes, and
generate at least one class-specific procedure for each class, the procedure for a class extracting a value for each identifying attribute and relationship attribute identified in the referential integrity metadata framework for the class, generate a data manipulation language statement using the extracted values, and issue the data manipulation language statement,
wherein the at least one application program uses the database environment to persist entire object data documents in their entirety and enforce referential integrity in relationships between object data documents.

9. The system of claim 8, wherein the initialization module is further configured to generate three class-specific procedures for each class, a first procedure being an insert procedure that inserts a row into a table corresponding to the class, a second procedure being an update procedure that updates a row in the table corresponding to the class, and a third procedure being a delete procedure that deletes a row in the table corresponding to the class.

10. The system of claim 8, wherein the referential integrity metadata framework specifies, for each relationship, whether the relationship is polymorphic or not.

11. The system of claim 10, wherein the initialization module is further configured to use the referential integrity metadata framework to:
determine whether the relationship between a first relationship attribute and a first identifying attribute is polymorphic;
when the relationship is not polymorphic, generate a foreign key; and
when the relationship is polymorphic, generate at least six database triggers.

12. The system of claim 11, wherein the at least six database triggers include:
a trigger for the insertion of a row in a table having a column corresponding to the first relationship attribute;
a trigger for the update of the first relationship attribute in the table;
a trigger for the deletion of a row in a table having a column corresponding to the first identifying attribute;

a trigger for update of the column in the table corresponding to the first identifying attribute;

a trigger for the deletion of a row in a table having a column corresponding to a second identifying attribute, the second identifying attribute being related to the first relationship attribute in the referential integrity metadata framework; and a trigger for update of the column in the table corresponding to the second identifying attribute.

13. The system of claim 8, wherein the initialization module is further configured to:
determine unique data types of the identifying attributes and relationship attributes; and
generate extraction functions corresponding to respective unique data types, the extraction function taking an attribute and an object data document as parameters and returning a value corresponding to the attribute from the object data document, the value having a type corresponding to the data type.

14. The system of claim 8, wherein the initialization module is further configured to generate three class-specific procedures for each class, a first procedure being an insert procedure that inserts a row into a table corresponding to the class, a second procedure being an update procedure that updates a row in the table corresponding to the class, a third procedure being a delete procedure that deletes a row in the table corresponding to the class and the referential integrity metadata framework stores an identifier of the first procedure, an identifier of the second procedure, and an identifier of the third procedure in for each class.

15. The system of claim 8, wherein the memory further stores instructions that, when executed by the at least one processor, cause the system to perform operations comprising:
receiving a request from an application program to insert a new object data document;
determining a class for the new object data document; and
calling the class-specific procedure for the class of the new object data document, the class-specific procedure generating the data manipulation language statement that inserts the new object data document and extracted values as a row in a table in the database environment, the table corresponding to the class in the referential integrity metadata framework.

16. The system of claim 8, wherein the referential integrity metadata framework specifies, for a first relationship attribute with a many-to-many relationship with a corresponding identifying attribute in another class, an association class, the association class having the identifying attribute for the other class and the first relationship attribute as identifying attributes for the association class and as relationship attributes for the association class.

17. A method comprising:
receiving an object data document and an operation to perform on the object data document from an application program;
determining a class in a referential integrity metadata framework for the object data document, the referential integrity metadata framework specifying at least an identifying attribute and a relationship attribute from the object data document for the class; and
calling a class-specific stored procedure based on the class, the class-specific stored procedure being configured to:
extract a first value for the identifying attribute from the object data document,
extract a second value for the relationship attribute from the object data document,
build a data manipulation language statement using the first value and the second value that performs the operation on a table in a relational database system, the table corresponding to the class in the referential integrity metadata framework and including a column for the identifying attribute, a column for the relationship attribute, and a column that stores the object data document, and
issue the data manipulation language statement for the relational database system to execute, the relational database system enforcing referential integrity constraints based on the relationship attribute.

18. The method of claim 17, wherein the class-specific stored procedure is generated by an initialization module, the initialization module being configured to:
use the referential integrity metadata framework to automatically create the table in the relational database system, the table including a column for the identifying attribute, a column for the relationship attribute, and a column for the object data document; and
use the referential integrity metadata framework to automatically create referential integrity structures for the table in the relational database system.

19. The method of claim 18, wherein the referential integrity structures include foreign keys and database triggers.

20. The method of claim 18, wherein the table lacks columns for attributes in the object data document that are not referential integrity attributes.

* * * * *